United States Patent [19]

Ellingsen

[11] Patent Number: 4,915,567
[45] Date of Patent: Apr. 10, 1990

[54] FLATRACK LOADING SYSTEM AND METHOD FOR PALLETIZED LOADING SYSTEM

[75] Inventor: Svein Ellingsen, Kirkland, Wash.
[73] Assignee: Paccar Inc., Bellevue, Wash.
[21] Appl. No.: 275,700
[22] Filed: Nov. 23, 1988

Related U.S. Application Data

[63] Continuation of Ser. No. 925,315, Oct. 31, 1986, abandoned.

[51] Int. Cl.⁴ ............................................. B60P 1/64
[52] U.S. Cl. ...................................... 414/345; 410/77; 414/498
[58] Field of Search ........................................... 410/77

[56] References Cited

U.S. PATENT DOCUMENTS

| | | | |
|---|---|---|---|
| 2,534,156 | 12/1950 | Wyatt et al. | 414/500 |
| 2,639,825 | 5/1953 | Eakin . | |
| 2,745,566 | 5/1956 | Bouffard | 414/500 X |
| 3,239,080 | 3/1966 | Corompt . | |
| 3,259,400 | 7/1966 | Tantlinger et al. | 410/81 |
| 3,610,690 | 10/1971 | Mengel . | |
| 3,878,948 | 4/1975 | Corompt . | |
| 3,894,013 | 10/1976 | Wirz . | |
| 3,942,664 | 3/1976 | Lemaire . | |
| 3,987,918 | 10/1976 | Corompt . | |
| 4,132,325 | 1/1979 | Corompt . | |
| 4,548,541 | 10/1985 | Corompt . | |
| 4,755,098 | 7/1988 | Wulf et al. | 414/498 |

FOREIGN PATENT DOCUMENTS

| | | | |
|---|---|---|---|
| 23118 | 6/1935 | Australia | 410/81 |
| 734310 | 5/1966 | Canada | 410/80 |
| 712474 | 9/1941 | Fed. Rep. of Germany | 410/77 |
| 2332849 | 9/1974 | Fed. Rep. of Germany | 414/345 |
| 310623 | 10/1969 | Sweden | 410/77 |
| 327169 | 3/1970 | Sweden . | |
| 10957 | of 1846 | United Kingdom | 410/52 |
| 1542045 | 3/1979 | United Kingdom | 414/500 |
| 2112756 | 7/1983 | United Kingdom | 414/345 |

*Primary Examiner*—Robert J. Spar
*Assistant Examiner*—Robert S. Katz
*Attorney, Agent, or Firm*—Seed and Berry

[57] ABSTRACT

An improved flatrack loading system and method for a palletized loading system for loading flatracks with palletized cargo and containers onto a cargo trailer, which allow quick, efficient, and accurate loading even on rough terrain. Skid plates on the rear end of the flatrack slide along smooth slide tracks on the trailer and are automatically affixed to the rear of the trailer on contact. The front end of the flatrack is automatically aligned along the skid tracks with the front of the trailer for easy manual affixation.

23 Claims, 6 Drawing Sheets

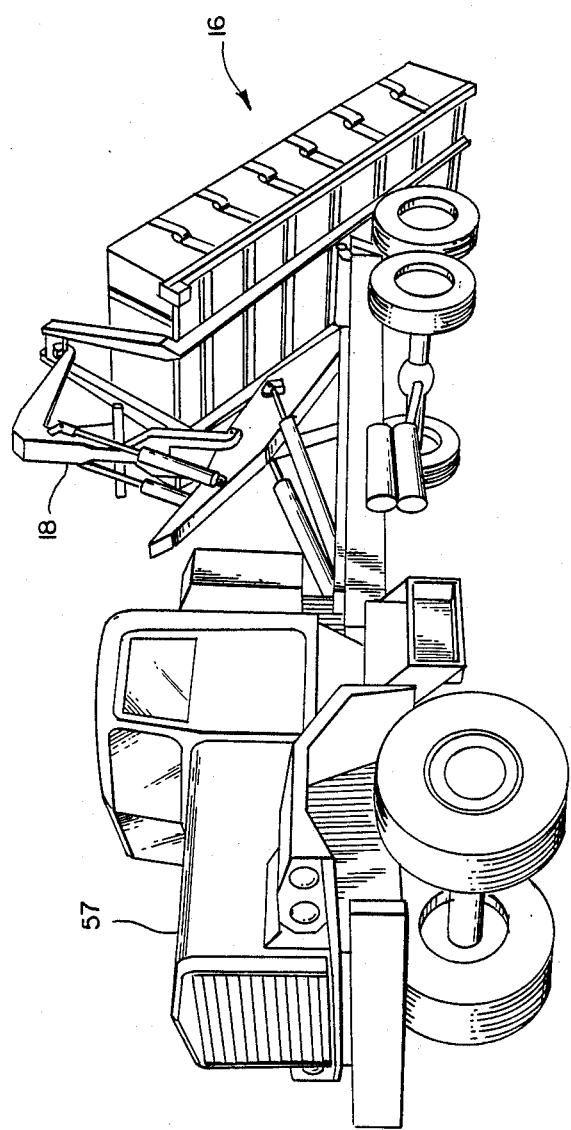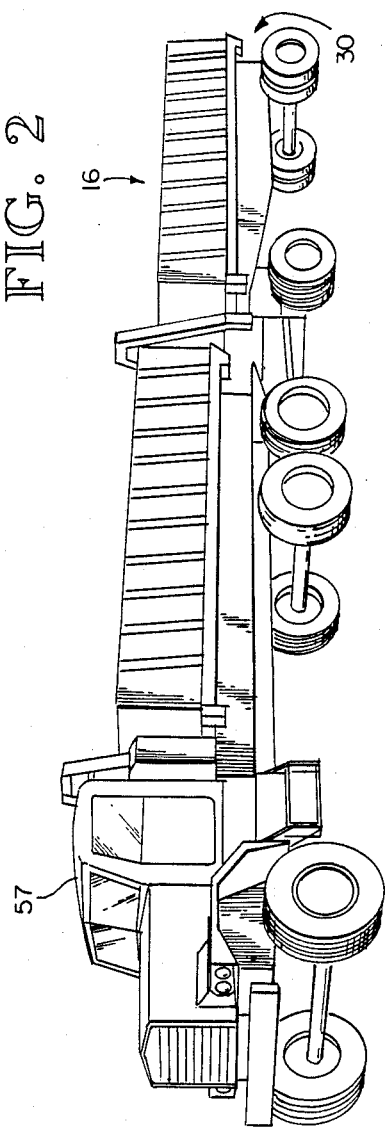

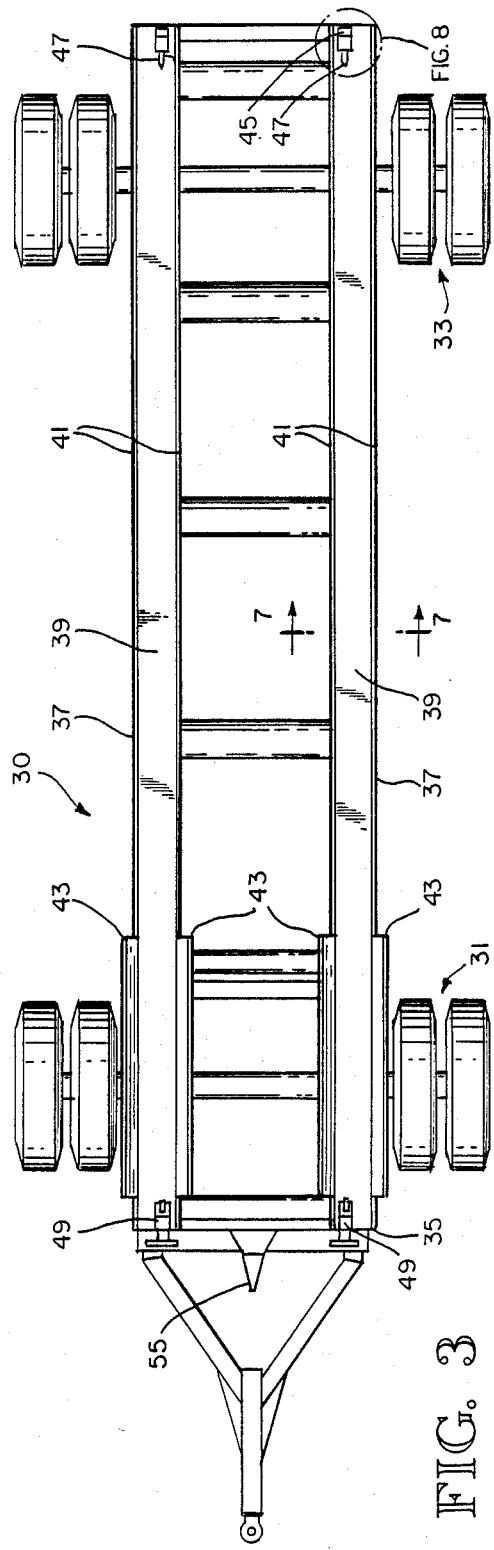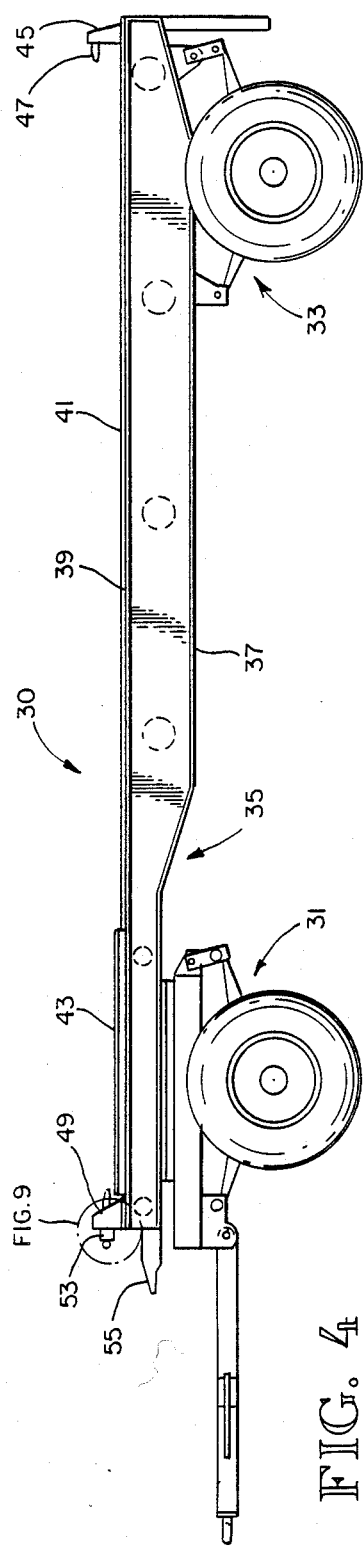

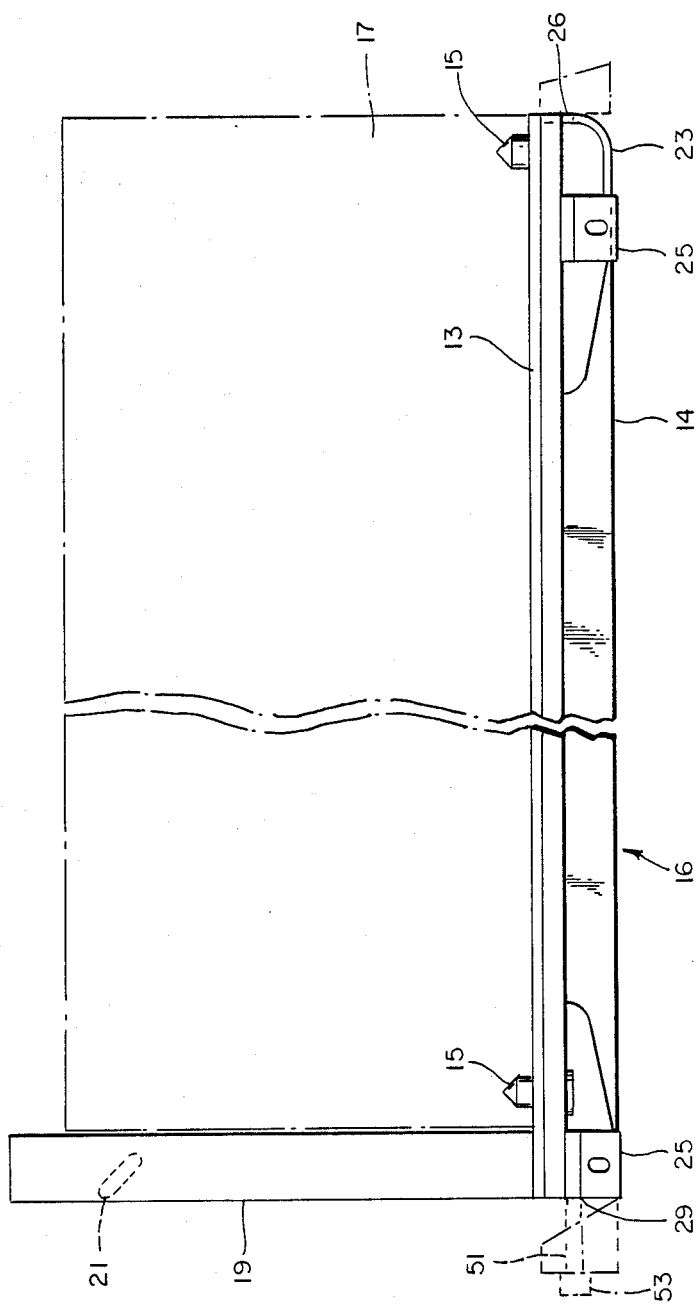

FIG. 6
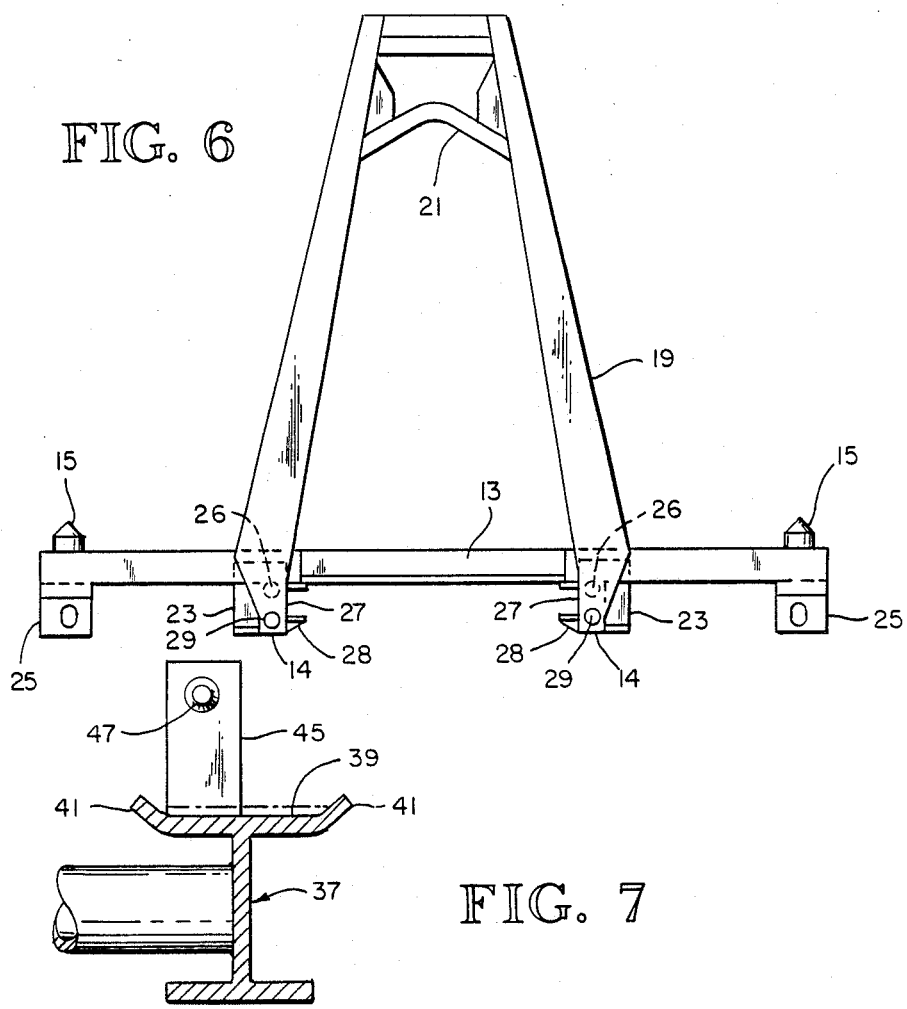
FIG. 7
FIG. 8
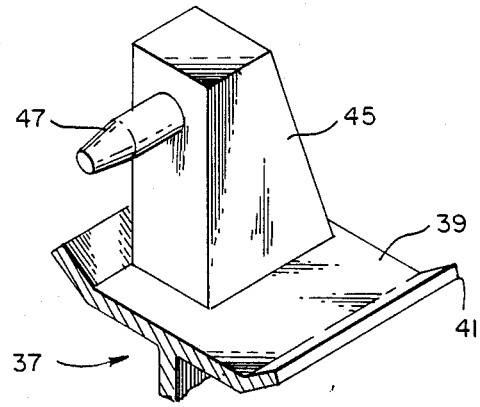

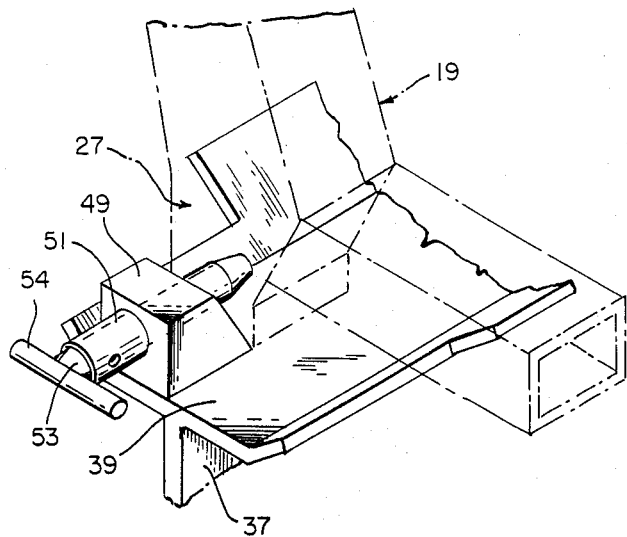
FIG. 9
FIG. 10
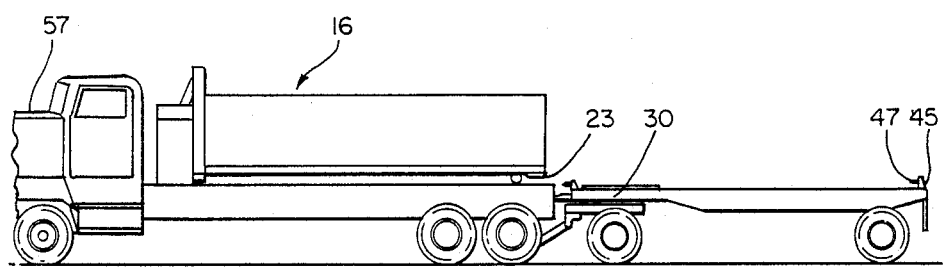
FIG. 11
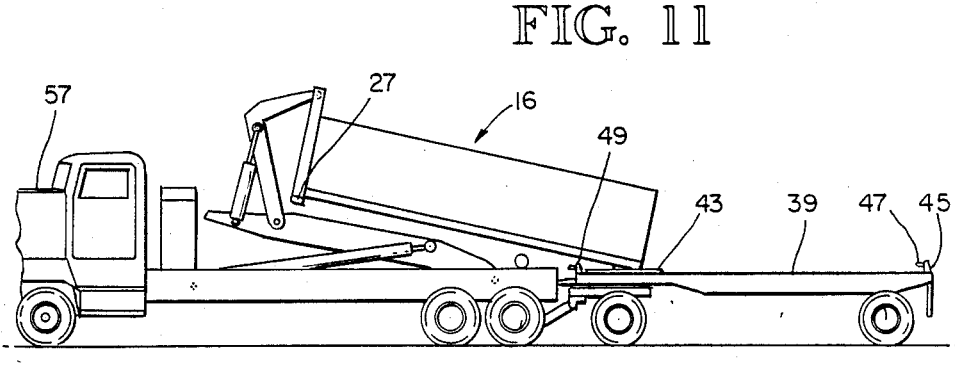

FLATRACK LOADING SYSTEM AND METHOD FOR PALLETIZED LOADING SYSTEM

This application is a continuation of U.S. patent application Ser. No. 925,315, filed Oct. 31, 1986, now abandoned.

TECHNICAL FIELD

This invention relates to vehicle trailer cargo loading and unloading systems, and more particularly, to palletized loading systems and method for loading and unloading a flatrack with palletized cargo or containers onto a truck chassis and for moving them between the truck chassis and a trailer.

BACKGROUND ART

Palletized loading systems are known in which self-contained flatracks loaded with palletized cargo are moved from a position on the ground onto a truck by means of a hydraulic arm, hoist or crane 18 which may be mounted on the truck. When it is desired for the load capacity to be increased, the truck can be fitted to pull a trailer which can accommodate a second flatrack.

In order to load a flatrack onto a palletized loading system trailer, it must first be loaded onto the truck. Then the truck is backed up to the forward end of the trailer, and the flatrack is transferred rear end first onto the trailer. The truck then drives off and picks up a second flatrack, returns to attach the trailer, and the truck moves off with both loads.

Conversely, when unloading, the trailer is detached, the truck is unloaded, the trailer load is transferred onto the truck, and the second load unloaded onto the ground. It can be seen that in circumstances such as military operations where military hardware or medical supplies are being delivered to the filed, speedy and efficient loading and unloading of cargo are a necessity.

Existing systems for moving a flatrack from a truck to a trailer and securing it to the trailer utilize roller load-bearing surfaces and ISO corner castings with twist-lock pins. This design has not proved to be acceptable, as the rollers tend to "freeze up" under heavy loads and easily become jammed with rocks and debris out in the field. Further, the corner-casting "lock-in" mechanism requires that holes in the four corners of the flatrack line up with holes in the trailer frame to accept twist-lock pins. Alignment does not always occur on first loading, especially on uneven ground, necessitating re-lifting and realigning the load. Existing designs also require heavy outrigger beams extending perpendicularly from the main frame beams of the trailer, which add weight and cost to the trailer, and also require manual insertion of twist pins at four separate points.

DISCLOSURE OF THE INVENTION

It is an object of this invention to provide an improved flatrack loading system and method which allow flatracks with palletized cargo or containers to be loaded onto a trailer quickly and efficiently.

It is another object of this invention to provide an improved flatrack loading system and method which allow flatracks to be quickly and efficiently loaded onto trailers on uneven ground.

It is another object of this invention to provide an improved flatrack loading system and method which allow flatracks to be secured at the rear end automatically without the need for readjustment, especially on uneven ground.

It is another object of this invention to provide an improved flatrack loading system and method which allow flatracks to be locked in at the front end with a minimum of manual effort by automatically aligning fastener holes in the flatrack and the trailer.

It is another object of the this invention to provide an improved flatrack loading system and method which will quickly and efficiently load a flatrack such that it will hold securely when traveling over rough terrain.

It is another object of this invention to provide an improved flatrack loading system and method with a guiding, sliding and load-bearing surface which will not become jammed by debris in the field.

It is another object of this invention to provide an improved flatrack loading system and method which will reduce weight and expense required in construction of cargo trailers.

These and other objects of the invention, which will be apparent to those skilled in the art as the invention is more fully described below, are obtained by providing an improved flatrack loading system and method for quickly and efficiently loading a flatrack onto a flatrack loading system trailer.

A preferred embodiment calls for elongated support members on the base of a flatrack containing a cargo pallet or container, each member having at one end a curved skid plate and at the other an angled end plate and each plate having one or more securing pin holes. Skid tracks are provided on the trailer, which may be an integral part of the chassis beams of the trailer, and which are matched to the skid plates of the flatrack or container in distance apart and in individual width such that the skid plates will slide in the tracks of the trailer, and the support members will nestle in the tracks when the flatrack is fully loaded, thereby keeping the cargo properly positioned laterally on the trailer.

The trailer also includes means for automatically securing the rear end of the flatrack when it is fully transferred. This is accomplished by stop blocks at the rear end of each slide track and coupling mechanisms. The front end of the trailer is provided with positioning blocks which position the front end of the flatrack in place and fastener holes that will align when the flatrack is fully transferred. When a fastener is manually inserted through the fastener hole, the fastener will secure the front end of the flatrack. The support members will rest in the tracks of the trailer to provide load-bearing support for the flatrack.

Thus it can be seen that the flatrack will be automatically positioned front and rear, and automatically secured on the rear end so that loading can be completed quickly and accurately, with insertion of the front fasteners as the only manual effort required. Likewise, in unloading the trailer, the only manual effort required is the removal of the front fasteners before the cargo can be mechanically unloaded.

BRIEF DESCRIPTION OF THE DRAWINGS

FIG. 1 is an isometric view of a flatrack loading system truck loading a flatrack.

FIG. 2 is an isometric view of a fully loaded truck and trailer.

FIG. 3 is a top plan view of an improved trailer for a flatrack loading system.

FIG. 4 is a side elevational view of the trailer.

FIG. 5 is a side elevational view of an improved flatrack unit with a common central portion cut away for convenience of illustration.

FIG. 6 is a front elevational view of a flatrack showing an A-frame and front end plates.

FIG. 7 is an enlarged cross-sectional view taken from FIG. 3 along the line 7—7 showing details of the support member and stop block.

FIG. 8 is an isometric detail view of the rear stop block taken from the circle marked 8 in FIG. 3.

FIG. 9 is an isometric detail view of the front positioning block with a portion of the flatrack shown in phantom lines, take from the circle marked 9 in FIG. 4.

FIGS. 10–12 show a schematic of the procedure for moving a flatrack from a truck onto an improved trailer.

FIG. 10 shows a truck backed up in position to load the trailer.

FIG. 11 shows the system in the process of moving the flatrack from truck to trailer.

FIG. 12 shows the flatrack fully loaded and secured on the trailer.

BEST MODE FOR CARRYING OUT THE INVENTION

Figure 12:
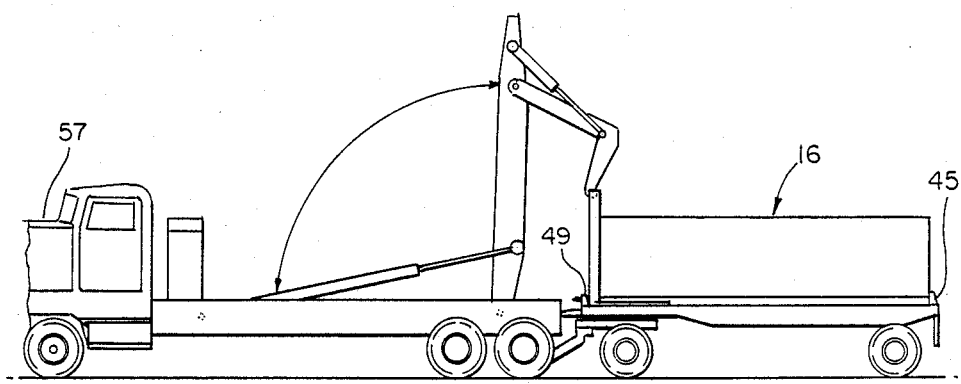

A preferred embodiment of the improved flatrack loading system and method of the present invention is illustrated in the accompanying drawings. FIG. 1 shows a truck 57 provided with a hydraulic arm 18 for loading flatrack units from the ground to the truck. The flatrack may then be moved in a quick, efficient, and accurate manner onto a trailer 30 (FIG. 2) using the present invention to increase the load capacity of a single truck and to decrease time and cost in loading, unloading, and transporting cargo.

FIG. 5 illustrates an improved flatrack 16 which has elongated support members or rails 14 supporting a load platform 13. Positioning pins 15 are provided for securing cargo 17 to the flatrack. An A-frame 19 on the front end of the flatrack allows a loading mechanism to lift the flatrack by attaching a lifting bar 21. The support rails terminate at one end in a curved skid plate 23. Standard ISO corner castings 25 may be provided so that the flatrack may be used with conventional trailers.

FIG. 6 shows the front of the trailer; having front end plates 27 on the support members 14 with front plate securing pin holes 29 for accepting securing pins. The support members terminate at the rear end in skid plates 23 having skid plate securing pin holes 26. The inner bottom edges 28 of the skid plates 23 are inclined upward at an angle of approximately 36° from the horizontal.

FIGS. 3 and 4 show an improved trailer 30 with forward wheel assemblies 31 and rear wheel assemblies 33 supporting a chassis 35 that is made up of two elongated steel support beams 37. The support beams have a smooth-surfaced skid track 39 running their length, with upwardly angled flanges 41 on either side to guide the angled edge 28 of the skid plate 23 along the track. These flanges 41 can be better seen in FIG. 7. The flanges are inclined at an angle of approximately 54° from the vertical to match the angle of the inner edge 28 of the skid plates. Referring back to FIG. 3, the flanges are extended farther outward at the forward end of the trailer 43 to provide a wider surface area for accepting the flatrack skid plates 23 when the flatrack first makes contact with the trailer.

At the rear end of the skid tracks 39 are located stop blocks 45 with stationary forward-facing securing pins 47 affixed to them. These stationary securing pins are tapered for easy insertion and alignment, and are positioned and proportioned so as to enter the skid plate securing in holes 26 when the flatrack is fully loaded on the trailer.

The front ends of the skid tracks 39 are provided with positioning blocks 49 which are angled downward toward the rear of the trailer and contain positioning block securing pin holes 51. The blocks 49 are proportioned and positioned so as to contact the front end plates 27 of the flatrack when the flatrack is fully loaded in such a way that the positioning block pin holes 51 align with the front plate pin holes 29 to accept handheld securing pins 53, which are elongated and tapered for insertion in the pin holes and which have a handle or gripping part 54 for manual insertion and removal. When inserted in the aligned pin holes, the securing pins 53 will secure the front end of the loaded flatrack to the trailer. The pin holes 51 may be counterbored on the rear side of the block to prevent chipping and catching when the flatrack is dropped onto the trailer.

The trailer may be provided with a guide prong 55 which is adapted to fit into a receptacle on a truck to assure proper alignment of truck and trailer and to prevent the front of the trailer from rising when the front end of the flatrack is lifted from the trailer.

The operation of the improved flatrack loading system and method is illustrated in FIGS. 10–12. A truck 57 carrying an improved flatrack 16 backs up to an improved trailer 30 (FIG. 10). As the truck begins to unload the flatrack (FIG. 11), the skid plates 23 of the flatrack contact the skid tracks 39 of the trailer at the forward end 43, where the flanges 41 are further extended laterally. As the flatrack is pushed backward onto the trailer, the skid plates 23 travel along the skid tracks 39, guided by the upwardly angled flanges 41 and the angled inner edges 28, until the skid plates contact the stop blocks 45. The steel-to-steel contact eliminates problems with existing systms in which rollers may become jammed with debris or roller bearings may fail because of excessive load.

Upon contact of the skid plates 23 with the stop block 45, the stationary securing pin 47 automatically engages the skid plate pin hole 26, preventing lateral, vertical, and rearward movement of the rear end of the cargo flatrack. As the front end of the flatrack is lowered onto the trailer, the front end plate 27 of the flatrack drops in front of the positioning block 49. The extended flanges 43 automatically laterally align the front end of the flatrack. The angled rear end of the positioning block will ease the flatrack rearwardly as it is dropped to align the pin holes in the positioning blocks 49 and front end plates 27, and firmly seat the rear skid plate 23 against the stationary rear securing pin 47 and stop block 45. Manual insertion of a hand-held securing pin 53 will secure the front end of the flatrack preventing lateral, vertical, and forward movement, and complete the transfer of flatrack from truck to trailer.

Unloading the flatrack 16 from the trailer entails following the steps for loading in reverse order. When the front hand-held securing pins 53 are withdrawn from the front positioning blocks 49, the front end of the flatrack may be lifted by a hydraulic arm 12 or other unloading mechanism. As the flatrack is pulled from the trailer onto the truck, the rear skid plates 23 will automatically disengage from the rear stationary securing pins 47 and will slide forward along the trailer skid tracks 39. The support members 37 will ride on and be supported by the front positioning blocks 49 as the flatrack is pulled from the trailer onto the truck.

We claim:

1. An improved flatrack loading system comprising:
   (a) a self-contained flatrack with a front end and a rear end, having fastener holes at the front end, and having elongated support members positioned parallel to each other, said support members having a front end, a rear end and side edges extending from said front end to said rear end, said side edges having an upwardly angled side edge portion extending longitudinally along said respective support members which align the flatrack as it moves along a trailer, each support member having a curved, non-rotatable rear skid plate having said upwardly angled side edge portion secured to the rear end and a front end plate at the front end;
   (b) the trailer with a front end and a rear end having fastener holes at the front end, and having elongated trough-shaped said tracks having upwardly angled flanges, said skid tracks being positioned parallel to each other for receiving the flatrack support members and aligning the flatrack as it moves along the trailer, each skid track having a front positioning block with a downwardly sloped rear face at the front end and a rear stop block at the rear end;
   (c) means for moving the flatrack onto the trailer such that the rear skid plates of the flatrack support members contact and move along the skid tracks as the flatrack is moved onto the trailer, said upwardly angled flanges forming an aligning contact with said upwardly angled side edges for maintaining said flatrack and said trailer in alignment as said flatrack moves along said tracks, and such that the skid plates contact the rear stop blocks and the front end plate is aligned with the front positioning blocks when the flatrack is fully loaded onto the trailer;
   (d) coupling mechanisms having a horizontal projecting member and a horizontal receiving member, one member being located on the rear end of the flatrack and other member being located at the rear end of the trailer, the projecting member engaging the receiving member to secure the rear end of the flatrack to the rear end of the trailer when the flatrack is fully loaded; and
   (e) hand-held fasteners for manually securing the front end of the flatrack to the front end of the trailer by horizontal insertion through the fastener holes in the flatrack and the trailer which are aligned when the flatrack is fully loaded.

2. The improved flatrack loading system according to claim 1 wherein the coupling mechanism for securing the rear end of the flatrack includes a projecting securing pin and a horizontal securing pin hole for engaging the securing pin when the flatrack contacts the rear end of the trailer.

3. The improved flatrack loading system according to claim 1 wherein the coupling mechanism for securing the rear end of the flatrack includes a horizontally forward-facing stationary securing pin attached to and extending from the rear stop block of the trailer, and a horizontal securing pin hole in the skid plate of the flatrack for engaging the horizontal stationary securing pin when the flatrack contacts the stop block.

4. The improved flatrack loading system according to claim 1 wherein the hand-held fasteners are hand-held securing pins and the fasteners holes in the flatrack and trailer are in the front end plates and in the front positioning blocks, respectively are horizontally positioned, and are aligned as the end plates and positioning blocks are aligned.

5. The improved flatrack loading system according to claim 1 wherein the skid tracks are smooth steel surfaces.

6. The improved flatrack loading system according to claim 1 wherein the support members are steel rails.

7. The improved flatrack loading system according to claim 1 wherein the skid tracks have upwardly angled flanges on the outer side edges.

8. The improved flatrack loading system according to claim 1 wherein the support members are proportioned to substantially contact the length of the skid tracks when the flatrack is fully moved onto the trailer.

9. An improved flatrack loading system comprising:
   (a) a self-contained flatrack having elongated support rails positioned parallel to each other, which align the flatrack as it moves along a trailer, each rail having at its rear end a curved, nonrotatable rear skid plate with one or more horizontal securing pin holes;
   (b) the trailer with elongated smooth, trough-shaped skid tracks positioned parallel to each other for aligning the flatrack as it moves along the trailer and proportioned to correspond to the length of the flatrack support rails and the width of the skid plates, each skid track having at its front end a front positioning block with one or more horizontal securing pin holes and a downwardly sloping rear face and at its rear end a rear stop block with a horizontally forward-facing protruding securing pin, and each skid track having upwardly angled flanges on its side edges;
   (c) means for moving the flatrack onto the trailer in such a way that the curved, non-rotatable rear skid plates of the flatrack contact the skid tracks at the front end and move along the skid tracks from front to back, the skid plates being guided in place along the skid tracks by the upwardly angled flanges the flatrack, a mating contact between said flanges and said skid tracks being formed while said flatrack is moving onto said trailer, such that the skid plates contact the rear stop blocks, the downwardly sloping rear face of said front positioning block and simultaneously the horizontal pin holes in the skid plates engage the horizontal securing pins of the stop blocks, thereby securing the rear end of the flatrack to the trailer, and such that the front end plates are aligned by the upwardly angled flanges with the front positioning blocks when the flatrack is fully loaded thereby aligning the horizontal pin holes in the front end plates and the positioning blocks; and
   (d) hand-held securing pins for horizontal insertion in the aligned pin holes in the front end plates and positioning blocks to secure the front end of the flatrack to the trailer.

10. The improved flatrack loading system according to claim 9 wherein the upwardly angled flanges of the skid tracks are further extended outwardly in the front region of the skid track.

11. The improved flatrack loading system according to claim 9 wherein the securing pin holes are counterbored on the sloped rearward-facing side.

12. An improved method for loading a self-contained flatrack having a front end, a rear end, and elongated support members positioned parallel to each other which align the flatrack as it moves along a trailer, each support member having a curved, non-rotatable rear skid plate and a front end plate, onto the trailer having elongated trough-shaped skid tracks positioned parallel to each other which align the flatrack-type cargo unit as it moves along the trailer, each skid track having a front positioning block with a downwardly sloped rear face and a rear stop block, and securing the flatrack to the trailer utilizing a coupling mechanism with a horizontal projecting member and a horizontal receiving member, one member being located on the rear end of the flatrack and the other member being located on the rear end of the trailer, and horizontal fastener holes in the front end of the flatrack and in the front end of the trailer, comprising the steps of:
  (a) moving the flatrack onto the trailer rear-end first by sliding the skid plates along the skid tracks, said skid plates including an upwardly angled side edge extending longitudinally along said said plate and said skid tracks including upwardly angled flanges for mating with said side edges as said flatrack moves onto said trailer for maintaining alignment between said flatrack and said trailer while said flatrack is sliding onto said trailer;
  (b) contacting the stop blocks with the skid plates so that the horizontal projecting member of the coupling mechanism engages the horizontal receiving member and secures the rear end of the flatrack to the rear end of the trailer;

13. A method for loading a self-contained flatrack onto a trailer and securing it to the trailer as recited in claim 12 wherein the step of securing the rear end of the flatrack to the trailer includes engaging a horizontal securing pin hole in the rear end of the flatrack with a foward-facing horizontal securing pin mounted at the rear end of the trailer.

14. A method of loading a self-contained flatrack onto a trailer as recited in claim 12 wherein the skid plate on the flatrack and the skid track on the trailer are made of steel.

15. A method of loading a self-contained flatrack onto a trailer as recited in claim 12 wherein the horizontal fastener holes in the front end of the flatrack are in the end plates and the horizontal fastener holes in the front end of the trailer are in the positioning blocks.

16. A method of loading a self-contained flatrack onto a trailer as recited in claim 12 wherein the hand-held fasteners are hand-held securing pins.

17. An improved method for loading and securing a self-contained flatrack having elongated support rails positioned parallel to each other which align the flatrack as it moves along a trailer, each rail having at its rear end a curved, non-movable rear skid plate with one or more horizontal securing pin holes and at its front end a front end plate having one or more horizontal securing pin holes, onto the trailer having elongated smooth, trough-shaped skid tracks positioned parallel to each other for aligning the flatrack-type cargo unit as it moves along the trailer and proportioned to correspond to the length of the support rails and the width of the skid plates, each skid track having at its front end a front positioning block with one or more horizontal securing pin holes and a downwardly sloping rear face and at its rear and a rear strop block with a horizontally forward-facing, protruding securing pin, each skid track further having upwardly angled flanges on its side edges, and utilizing hand-held securing pins, comprising the steps of:
  (a) moving the flatrack onto the trailer rear end first by contacting the skid plates to the skid tracks and sliding them from front to back along the skid tracks;
  (b) contacting the skid plates to the stop blocks so that the horizontal pin holes in the skid plates engage the securing pins of the stop blocks, thereby securing the rear end of the flatrack to the trailer;
  (c) lowering the front end of the flatrack onto the front end of the trailer so that the front end plates are aligned by contacting the upwardly angled flanges of the skid tracks and by contacting the downwardly sloping rear face of the front positioning blocks and the horizontal pin holes in the front end plates are aligned with the securing pins in the positioning blocks; and
  (d) manually inserting the hand-held securing pins onto the aligned horizontal pin holes to secure the front end of the flatrack to the trailer.

18. A flatrack and trailer combination comprising:
  a self-contained flatrack having a front end and a rear end and elongated support members positioned parallel to each other and extending from said front end to said rear end, said elongated support members having side edges extending from said front end to said rear end, a portion of said side edges being upwardly angled;
  a trailer having a front end and a rear end and elongated skid tracks means positioned parallel to each other extending from said front end to said rear end, said skid tracks including flanges extending upwardly and angled outward from the center of said skid tracks for receiving the flatrack support members;
  means for moving said flatrack onto said trailer by causing said support members to slide in said skid tracks and causing said support members' side edge to contact said angled flanges of said skid tracks for maintaining alignment between said flatrack and said trailer while said flatrack is moving onto said trailer; and
  rear stop blocks positioned in said track and contacting said flatrack when said flatrack is on said trailer and a front end plate downwardly eloped for maintaining said flatrack on said trailer.

19. The apparatus according to claim 18 wherein the upwardly extending angle of said flanges is approximately the same as the upwardly extending angle of said side edges causing said side edges and said flanges to form a smooth, mating relationship when properly aligned in contact with each other and causing said flatrack to slide laterally along said flange when not in aligment to bring said flatrack into alignment onto said trailer.

20. The flatrack and trailer combination according to claim 18 wherein said support members include a curved rear skid plate secured at a rear end of said support members, said rear skid plate including the upwardly angled side edge portion extending longitudinally along said entire rear skid plate.

21. An improved flatrack loading system, comprising:
  (a) a self-contained flatrack having elongated support rails positioned parallel to each other, which align the flatrack as it moves along a trailer, each rail having at its rear end a curved, non-rotatable rear skid plate, said skid plate having an upwardly angled side edge and one or more horizontal securing pin holes;

(b) the trailer with elongated, smooth, trough-shaped skid tracks positioned parallel to each other for aligning the flatrack as it moves along the trailer, each skid track having upwardly angled flanges along a side edge;

(c) means for moving the flatrack onto the trailer in such a way that the upwardly angled side edge of the curved, non-rotatable rear skid plates of the flatrack contact the skid tracks at the front end and move along the skid tracks from front to back, the skid plates being guided in place along the skid tracks by the upwardly angled flanges, the upwardly angled flanges of the skid tracks being further extending outwardly in the front region of the skid track for aid in aligning said flatrack on said trailer.

22. The apparatus according to claim 21 wherein said skid track includes a rear stop block and a front positioning block having a downwardly sloping at rear face to aid in positioning said flatrack on said trailer.

23. The apparatus according to claim 22, further including securing pins extending through said rear stop block and said front end positioning block to secure the front end of said flatrack to said trailer.

* * * * *

UNITED STATES PATENT AND TRADEMARK OFFICE
CERTIFICATE OF CORRECTION

PATENT NO. : 4,915,567
DATED : April 10, 1990
INVENTOR(S) : Svein Ellingsen

It is certified that error appears in the above-identified patent and that said Letters Patent is hereby corrected as shown below:

In claim 1, column 5, line 20, delete "said" and substitute therefor --skid--.

In claim 12, column 7, line 22, delete "said" and substitute therefor --skid--.

In claim 12, column 7, between lines 32 and 33, insert the following:

-- (c) lowering the front end of the flatrack onto the front end of the trailer so that the front end plates are aligned with the positioning blocks, the support members are supported within the skid tracks, and the fastener holes in the front end of the flatrack and the front end of the trailer are aligned; and (d) manually inserting the hand-held fasteners into the aligned, horizontal fastener holes to secure the front end of the flatrack to the front end of the trailer. --.

UNITED STATES PATENT AND TRADEMARK OFFICE
CERTIFICATE OF CORRECTION

PATENT NO. : 4,915,567

DATED : April 10, 1990

INVENTOR(S) : Svein Ellingsen

It is certified that error appears in the above-identified patent and that said Letters Patent is hereby corrected as shown below:

In claim 13, column 7, line 38, delete "foward" and substitute therefor --forward--.

In claim 17, column 7, line 67, delete "and a rear strop" and substitute therefor --end a rear stop--.

In claim 18, column 8, line 47, delete "eloped" and substitute therefor --sloped--.

Signed and Sealed this

Twenty-third Day of July, 1991

*Attest:*

HARRY F. MANBECK, JR.

*Attesting Officer*     *Commissioner of Patents and Trademarks*